United States Patent
Markley et al.

(10) Patent No.: US 7,476,168 B2
(45) Date of Patent: Jan. 13, 2009

(54) PIVOTING MECHANICAL TENSIONER WITH CROSS STRAND DAMPING

(75) Inventors: George L. Markley, Montour Falls, NY (US); Mark M. Wigsten, Lansing, NY (US); James Capp, Endwell, NY (US)

(73) Assignee: BorgWarner Inc., Auburn Hills, MI (US)

( * ) Notice: Subject to any disclaimer, the term of this patent is extended or adjusted under 35 U.S.C. 154(b) by 371 days.

(21) Appl. No.: 11/204,210

(22) Filed: Aug. 15, 2005

(65) Prior Publication Data

US 2007/0037646 A1    Feb. 15, 2007

(51) Int. Cl.
F16H 7/08    (2006.01)
(52) U.S. Cl. ...................................................... 474/111
(58) Field of Classification Search ................. 474/101, 474/109, 110, 111, 140
See application file for complete search history.

(56) References Cited

U.S. PATENT DOCUMENTS

| | | | | |
|---|---|---|---|---|
| 1,581,624 A * | 4/1926 | Wunderlich et al. | ........... | 474/87 |
| 1,758,246 A * | 5/1930 | Brackett et al. | ............. | 474/140 |
| 2,044,158 A * | 6/1936 | Dunlop | ........................ | 474/140 |
| 2,066,721 A * | 1/1937 | Eaton | .......................... | 474/109 |
| 2,117,195 A * | 5/1938 | McKerlie | ................... | 74/89.22 |
| 2,156,701 A * | 5/1939 | Petersen | ..................... | 474/114 |
| 3,136,169 A * | 6/1964 | Karger et al. | ................. | 474/23 |
| 4,337,055 A * | 6/1982 | Mackay et al. | .............. | 474/111 |
| 4,395,251 A | 7/1983 | King et al. | ................... | 474/111 |
| 5,266,066 A | 11/1993 | White | ........................ | 474/111 |
| 5,797,818 A | 8/1998 | Young | ........................ | 474/111 |
| 6,322,469 B1 * | 11/2001 | Markley | ..................... | 474/111 |
| 6,322,470 B1 * | 11/2001 | Markley et al. | ............. | 474/111 |
| 6,478,703 B2 | 11/2002 | Suzuki | ........................ | 474/101 |
| 2002/0045503 A1 | 4/2002 | Young et al. | ................. | 474/111 |
| 2002/0160868 A1 | 10/2002 | Wigsten et al. | | |
| 2005/0085322 A1 | 4/2005 | Markley | ..................... | 474/109 |

FOREIGN PATENT DOCUMENTS

DE          20213290        1/2004
JP          2002089636      3/2002

* cited by examiner

*Primary Examiner*—Vicky A Johnson
(74) *Attorney, Agent, or Firm*—Brown & Michaels, PC

(57) ABSTRACT

A closed loop chain tensioner system having a drive sprocket, one or more driven sprockets, a first mechanical tensioner located adjacent a slack strand and a second mechanical tensioner located adjacent a tight strand. Each tensioner is independently pivotally mounted to the engine block. The mounting point may be located at any point along the length of each tensioner. The tensioners are then linked to each other by a rigid, solid link. This solid link enables the tensioners to act in unison, thus providing damping across both strands of chain in response to engine torsional variations.

9 Claims, 9 Drawing Sheets

PIVOTING MECHANICAL TENSIONER WITH CROSS STRAND DAMPING

REFERENCE TO RELATED APPLICATIONS

This application is related to an application filed simultaneously, entitled, "LONG MECHANICAL TENSIONER WITH A COMPLIANT BLADE SPRING". The aforementioned application is hereby incorporated herein by reference.

BACKGROUND OF THE INVENTION

1. Field of the Invention

The invention pertains to the field of chain tensioners. More particularly, the invention pertains to a tensioner that has damping.

2. Description of Related Art

A tensioning device, is used as a control device for a power transmission chain, or similar power transmission devices, as the chain travels between a plurality of sprockets. In this device, the chain transmits power from a driving shaft to a driven shaft, so that part of the chain is slack and part of the chain is tight. Generally, it is important to impart and maintain a certain degree of tension in the chain to prevent noise, slippage, or the unmeshing of teeth in the case of a toothed chain. Prevention of such slippage is particularly important in the case of a chain driven camshaft in an internal combustion engine because jumping of teeth will throw off the camshaft timing, possibly causing damage or rendering the engine inoperative.

However, in the harsh environment of an internal combustion engine, various factors can cause fluctuations in the chain tension. For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example during the stopping of the engine or in failed attempts at starting, can also cause fluctuations in chain tension. For these reasons, a mechanism is desired to remove excessive tensioning forces on the tight side of the chain and to ensure the necessary tension on the slack side of the chain.

Blade tensioners are tensioners that are commonly used to control a chain or belt where load fluctuations are not so severe as to over flex the spring or springs. A ratchet with backlash is often added to tensioners to limit the effective backward or untensioned travel of a tensioning device.

FIG. 1 shows a prior art chain driving system having a blade tensioner and a guide. A closed loop chain encircles driving sprocket 12 and driven sprocket 10. Each sprocket 10, 12 accelerates and decelerates independently while maintaining forward motion. A fixed guide 14 is attached to a bracket 7 on the tight strand of the chain 8. Opposite the guide 14 on the slack strand of the chain is a tensioner 16, which is at least semi-rigidly fixed to the bracket 7 and biased towards the tight strand of the chain. Bolts 18 fasten the bracket containing the tensioner 16 and the guide 14 to the engine block (not shown).

When the driving sprocket 12 accelerates or the driven sprocket 10 decelerates, an energy wave or high local load is created in the tight strand of the chain, which travels from the sprocket that changed in velocity toward the other sprocket. The chain 8 attempts to span the distance between the link of the chain in contact with the initiating sprocket to the other sprocket in the shortest possible distance, a straight line. The energy moves through the links on the free strand of the chain until it comes to the end of the guide 14, which absorbs the energy. As a result of the constant absorption of the high local load, the ends of the guide 14 sustain significant wear. The energy wave would be present and show the same characteristics if it was to originate on the slack strand of the chain, although the wave energy may not occur at all depending on how well the tensioner keeps the slack out of the chain and how much damping the tensioner has.

One solution to reduce the load that results in the prior art chain driving system is to add damping to the tensioner. One problem associated with adding the required damping to a tensioner is that if the tensioner is softened significantly, it may result in a loss of chain control, since tensioners are specifically designed to apply just enough force to provide adequate chain control. Other solutions are shown in U.S. Pat. Nos. 5,797,818, and 6,322,470, as well as US Publication Nos. 2002/0045503 and 2005/0085322.

U.S. Pat. No. 5,797,818 discloses a chain assembly with reduced noise and vibration on the slack side of the chain that includes a blade shoe, a spring, and a resilient damping device. The shoe is pivotally mounted to the tensioner bracket. The spring is mounted to the shoe and biases the shoe towards the chain. The resilient damping device is mounted between the tensioner bracket and the spring to aid in controlling the vibration that occurs during valve events.

U.S. Pat. No. 6,322,470 discloses a tensioner that includes a pair of pivoting arms used to simultaneously tension two separate strands of the same chain. A lever with fixed pins is located between the two strands. The arms extend outside the strands of the chain and carry shoes positioned to contact the outside portion of the chain which are pivotally mounted to the fixed pins. Rotation of the lever causes the fixed pins to move laterally and the arms draw inward and tension is imparted to the separate chain strands at the same time. In other words, a high load on one side of the chain tries to transfer to the other side of the chain but the load eventually evens out.

US Publication No. 2002/0045503 discloses a chain tensioner that has a blade and spring assembly. The blade has a first end and a second end. The first end defines a hub. The hub is connected to the central portion of the blade shoe and a first end wall and defines a bore that receives a single pin that pivotably connects the blade to a mounting bracket.

FIG. 2 shows the pivoting chain guide and tensioner assembly of US Publication No. 2005/0085322. It consists of a chain guide 124 and a tensioner each in contact with one of the two strands of a closed loop chain 108 in a dual sprocket chain system, the chain 108 being routed around a drive sprocket 112 and a driven sprocket 110. The tensioner and chain guide are both connected to a bracket plate 122 which pivots about a single mounting point 120.

As shown in FIG. 3, a conventional chain tensioning system consists of two independently functional blade spring tensioners 306 and 306a that are located on each of the two strands of chain 300. These separately functional tensioners each include a bracket body 307, 307a, which each contain chain guides 308 and 308a. Within each bracket body 307 and 307a are at least one blade spring, identified as 510 (see FIG. 4) to urge chain guides 308 and 308a into forcible contact with the strands of chain 300 to which each mechanical spring tensioner 306 and 306a are adjacent. In this conventional system, each mechanical spring tensioner operates independently of the other. Each mechanical spring tensioner is securely mounted to the engine block, not shown, by securing means 312, which may be, for example bolts or press fit pins.

The only motion provided to adjust the tension between the slack and tight strand of chain 300 comes from the blade springs.

SUMMARY OF THE INVENTION

The present invention comprises a power transmission system having a drive sprocket, one or more driven sprockets, a first mechanical tensioner located adjacent the slack strand and a second mechanical tensioner located adjacent the tight strand. Each mechanical tensioner may provide slack control by use of compliant blade springs.

Each tensioner is pivotally secured to the engine block by separate mounting means. The tensioners are then linked to each other by a rigid, solid link which enables the tensioners to act in unison to control the backward and forward articulation of the chain between tight and slack conditions, thus providing damping across both strands of chain.

DETAILED DESCRIPTION OF THE INVENTION

Figure 5:
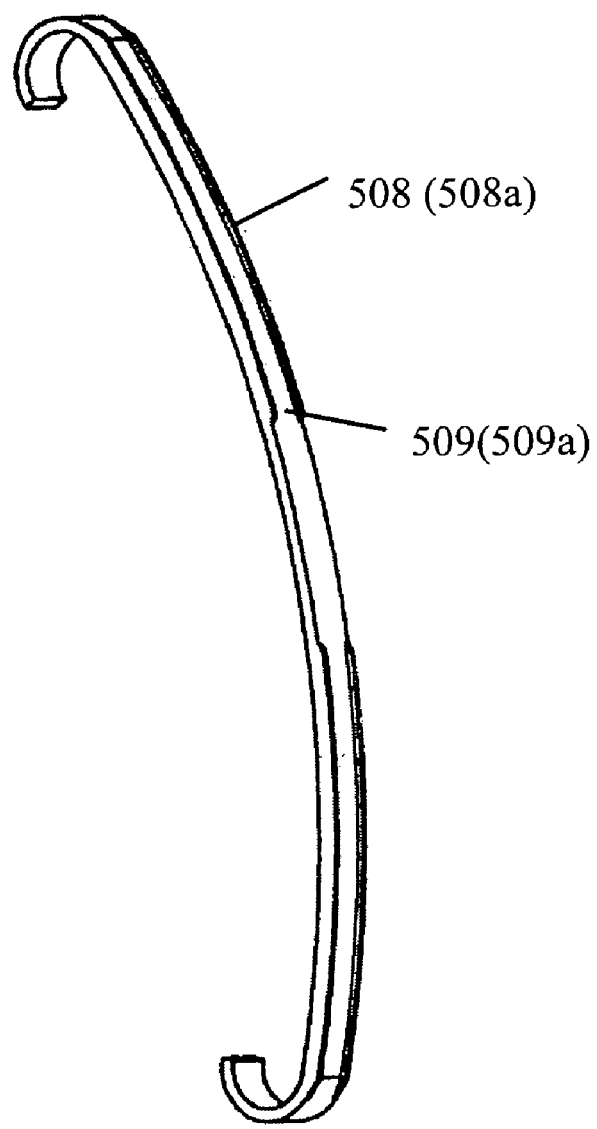
FIG. 5 shows a chain guide for use in the tensioner of FIG. 4.
Figure 6:
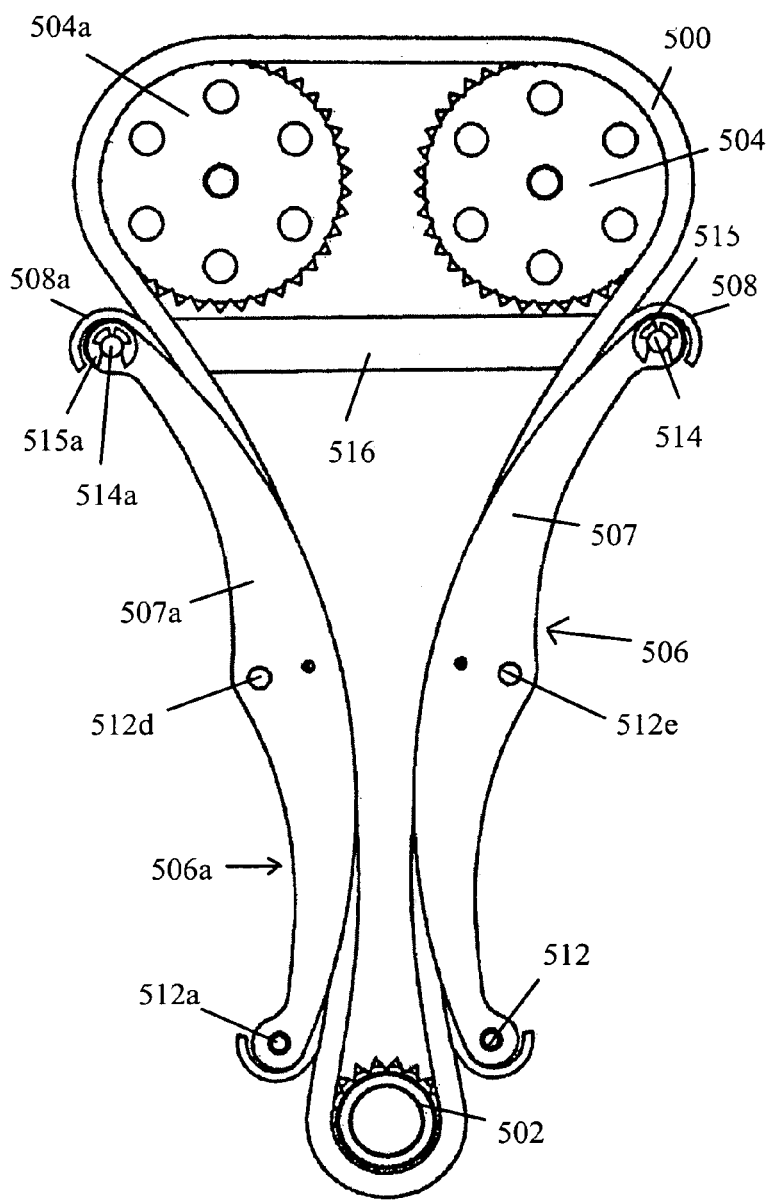
FIG. 6 shows a front perspective view of the interconnected dual tensioner system of the present invention.
Figure 7:
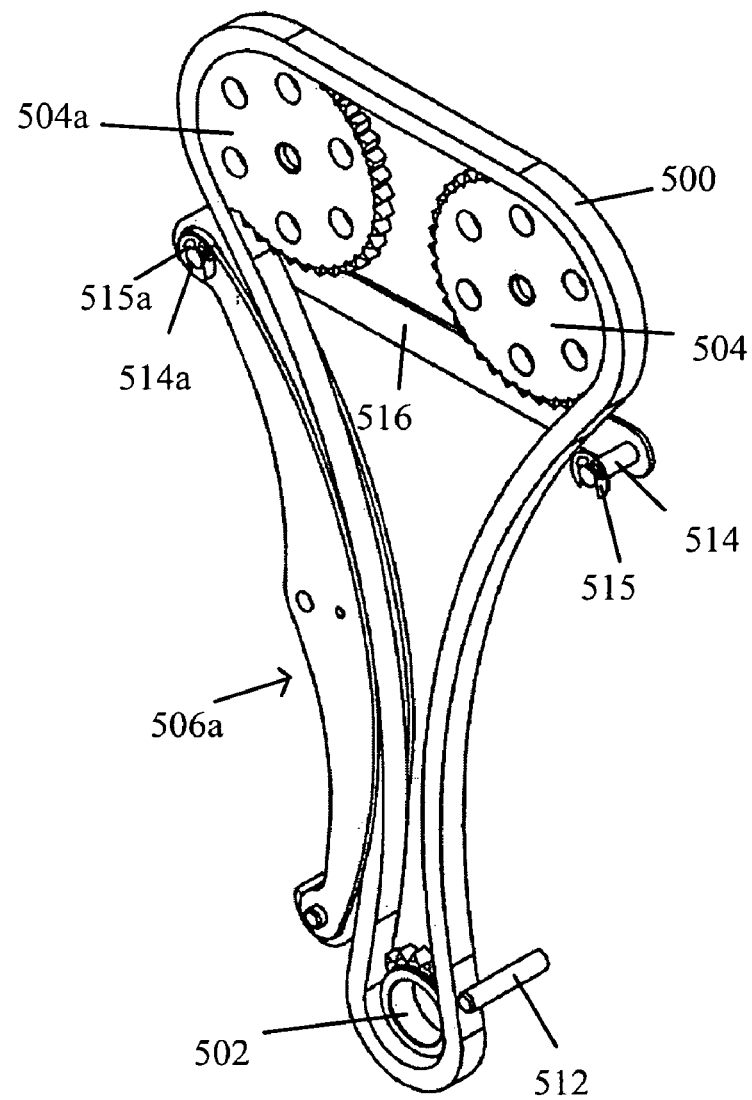
FIG. 7 shows an isometric view of the dual tensioner system of the present invention with one of the mechanical blade spring tensioners removed to show the pivot mount and securing means for the rigid link.

The present invention, as shown in FIGS. 6 and 7, comprises a continuous chain loop drive system having a chain 500, a drive sprocket 502, one or more driven sprockets 504, 504a and a pair of mechanical tensioners 506, 506a. The mechanical tensioners each consist of a bracket body 507 and 507a, and respective chain guide elements 508 and 508a each having a chain sliding face 509, 509a (FIG. 5). The chain sliding faces 509 and 509a are in slidable contact with the strand of chain 500 to which each mechanical tensioner is adjacent.

Springs, generally identified as 510 (FIG. 4), may provide the force needed to urge each of the chain guide elements 508 and 508a into forcible sliding contact with the chain 500. Blade spring 510 is an elongated rectangle curled lengthwise in its free state. Within the preferred tensioner shown in FIG. 4 the blade spring 510 exerts a force onto the underside of support member 505, which is also an elongated rectangular structure that is made from any material that will enable it to provide spring tension. The primary force urging the chain guide elements 508 and 508a toward their respective strands of chain comes from blade spring 510. The spring tension provided by the support member 505 need only be sufficient to transfer the force of the blade spring 510 substantially equally along the length of the chain guide elements 508 and 508a.

Each of the mechanical tensioners 506 and 506a, is secured to the engine block, not shown, by a single mounting means, such as a bolt, screw or press fit pivot pin, generally identified as 512 and 512a, respectively. In a first embodiment, as shown in FIG. 6, the mounting means provide a pivot point for its respective mechanical tensioner and is positioned at approximately the same corresponding location along the length of each mechanical tensioner. The mounting means 512 and 512a are shown as being located at a first end of each mechanical tensioner that is closest to the drive sprocket 502. The mounting means may also be located at other points along the length of each mechanical tensioner 506, 506a, such as at any point along the length of each bracket body 507 and 507a. One alternate location for mounting means is shown in FIG. 6 at 512c and 512d.

Positioned at the respective second ends of each of the bracket bodies 507 and 507a, as shown in FIG. 6, are pivot means 514 and 514a, respectively. Each pivot means 514 and 514a is secured to the second end of its respective bracket body 507 and 507a by locking means 515, 515a, respectively, or the like, or by a pin that is press fit into a hole in each bracket body 507 and 507a. One end of a solid rigid linking member 516 is attached to each pivot means 514 and 514a, thus coordinating the movements of the respective second ends of the mechanical tensioners 506 and 506a.

FIG. 7 shows an isometric view of the chain tensioner of FIG. 6 with one of the mechanical tensioners 506 removed to show in more detail the mounting means 512 and the pivot means 514.

When the drive sprocket 502 or at least one of the driven sprockets 504, 504a decelerates, the strand of chain 500 (for purposes of this example, the tight strand) will attempt to span the distance between the link of the chain in contact with the initiating sprocket to the other sprocket in the shortest distance possible, namely, a straight line. The specific movement of the chain 500 is not shown. This energy wave or high local load will force the end of the respective mechanical tensioner, in this example 506, at the pivot means 514 away from the chain 500. The end of the mechanical tensioner secured by the mounting means 512 remains pivotally fixed to the engine.

Concurrently, as the one strand is tightening, the opposite strand is becoming slack. However, due to the attachment of the linking member 516 to the opposite mechanical tensioner, in this case 506a, the linking member 516 will pull the end of mechanical tensioner 506a toward the slack strand of chain 500, thus substantially tensioning the slack strand.

The linking of the movements of the slack and tight strands provides for a degree of forgiveness in the cyclical tensioning and slackening of each of the strands of chain with respect to each other. By linking the relative movements of each of the strands, a damping effect occurs. The vibrations and torsional impulses experienced by one of the strands is substantially neutralized by linking this energy to the generally opposing energy impulse experienced by the opposite strand.

As described hereinabove, the mounting means. 512 and 512a for each mechanical tensioner 506 and 506a may be located at the ends of both mechanical tensioners nearest to the drive sprocket 502, for convenience, identified herein as their respective first ends. As further disclosed above, the mounting means may be located at any point along the length of each bracket body 507 and 507a, as dictated by design preferences. Many variables within the entire chain drive system may lead to different locations for, not only the mounting means 512, 512a, but also the pivot means 514, 514a and for linking member 516.

Figure 8:
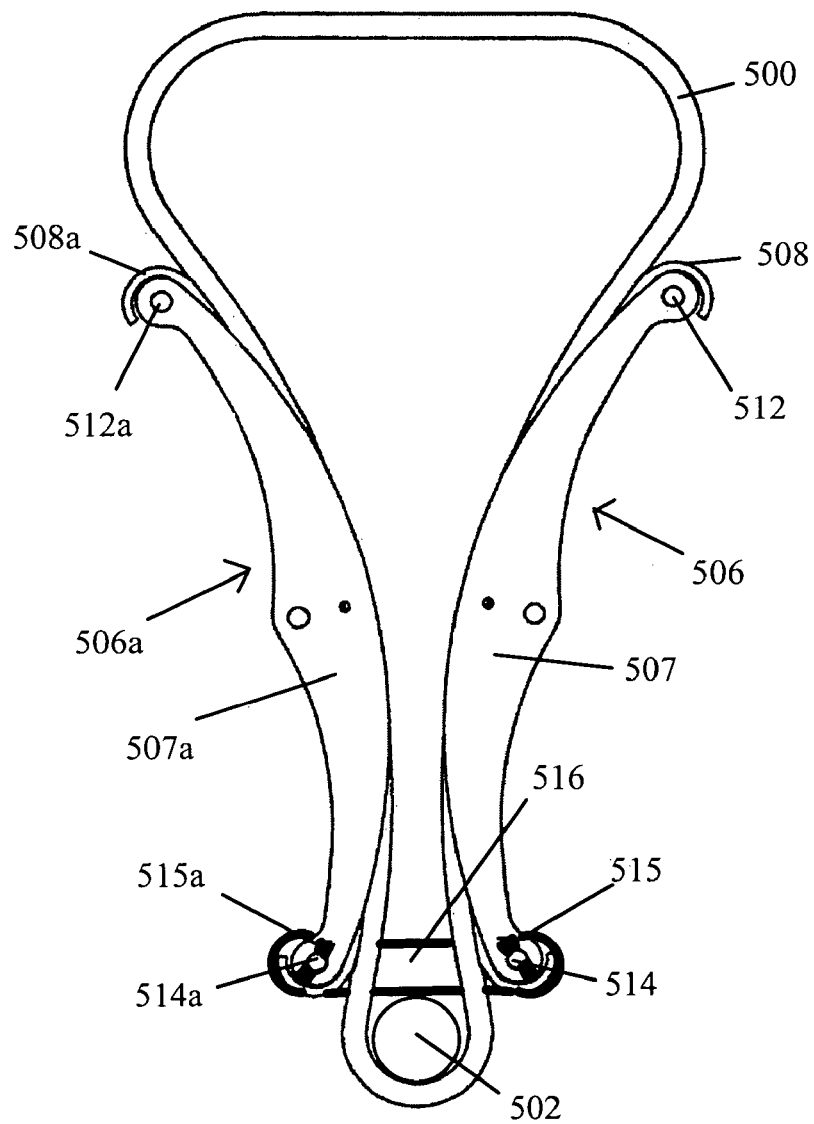
FIG. 8 shows a second embodiment of the present invention.

As shown in FIG. 8, different functional parameters and design requirements may necessitate locating the linking member 516 at a second end of each of the mechanical tensioners 506, 506a nearest the drive sprocket 502. In this second embodiment, the first ends of each of the mechanical tensioners are securely mounted to the engine block, via mounting means 512 and 512a and are located adjacent to the drive sprockets, not shown.

Figure 9:
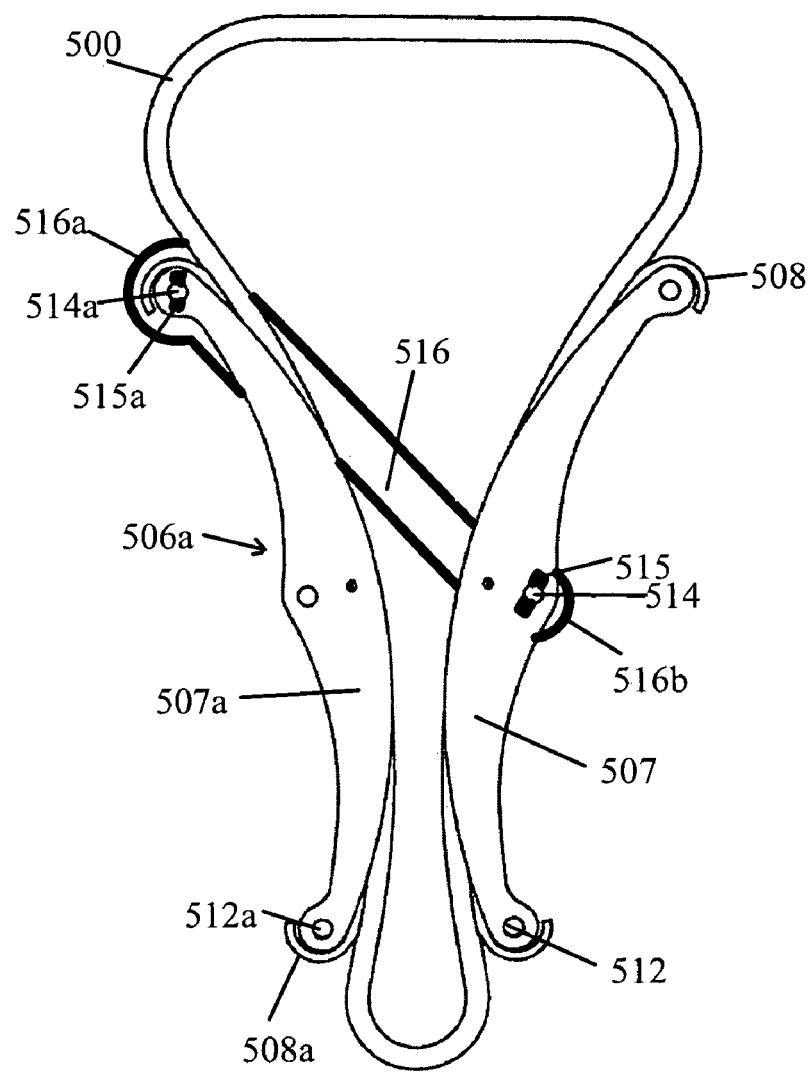
FIG. 9 shows a third embodiment of the present invention.

A third embodiment is shown in FIG. 9. In this embodiment, the first end 516a of the linking member 516 is pivotally secured to the end of the first tensioner 506a opposite the end of the first tensioner that is secured to the engine housing, not shown, by mounting means 512a. The second end 516b of the linking member 516 is pivotally secured at an approximate mid point along the length of second tensioner 506 by pivot means 514.

Figure 1:
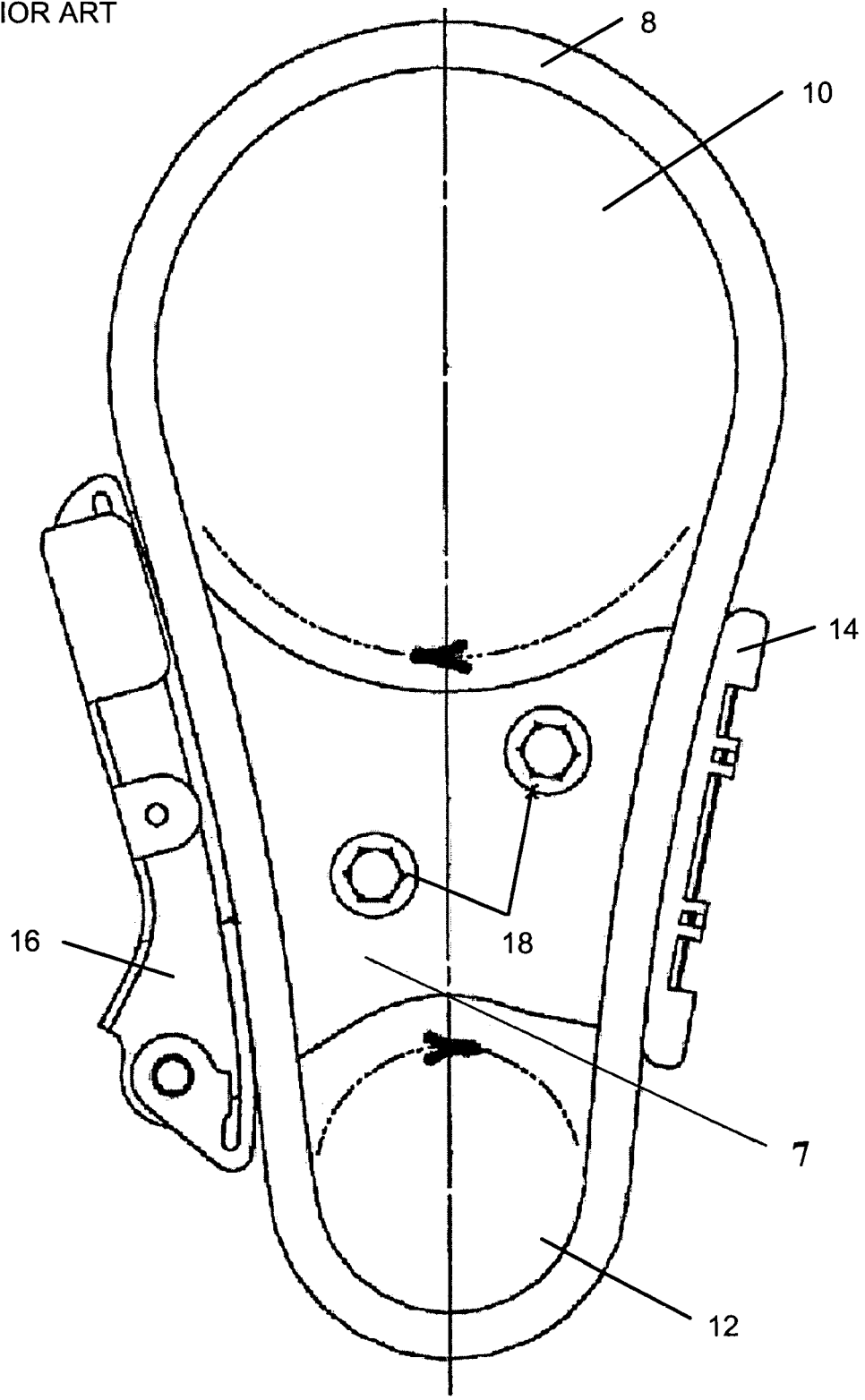
FIG. 1 shows a schematic of a prior art chain tensioner system having a securely mounted common bracket.
Figure 2:
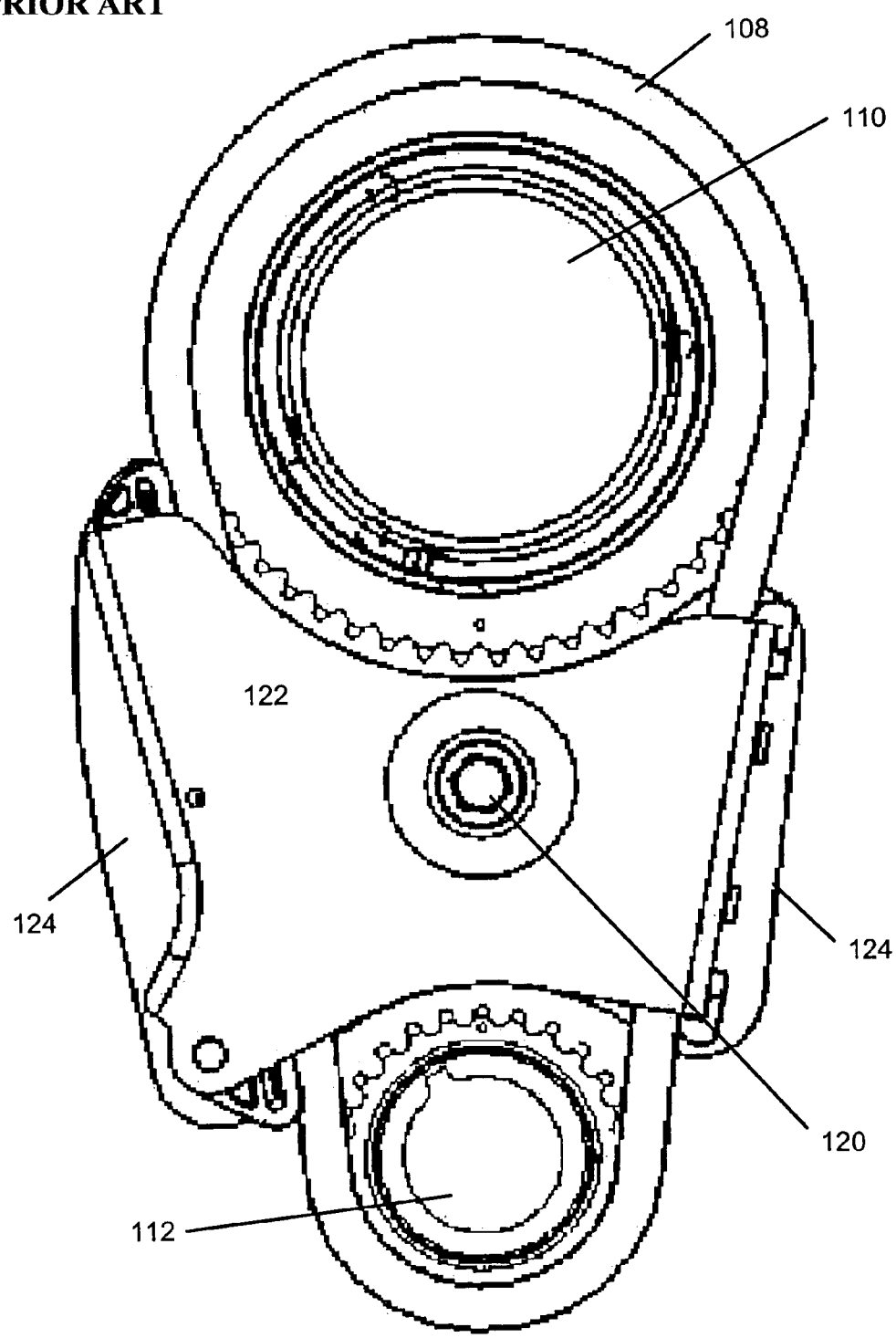
FIG. 2 shows a schematic of a chain tensioner system having a single centrally mounted pivot point.
Figure 3:
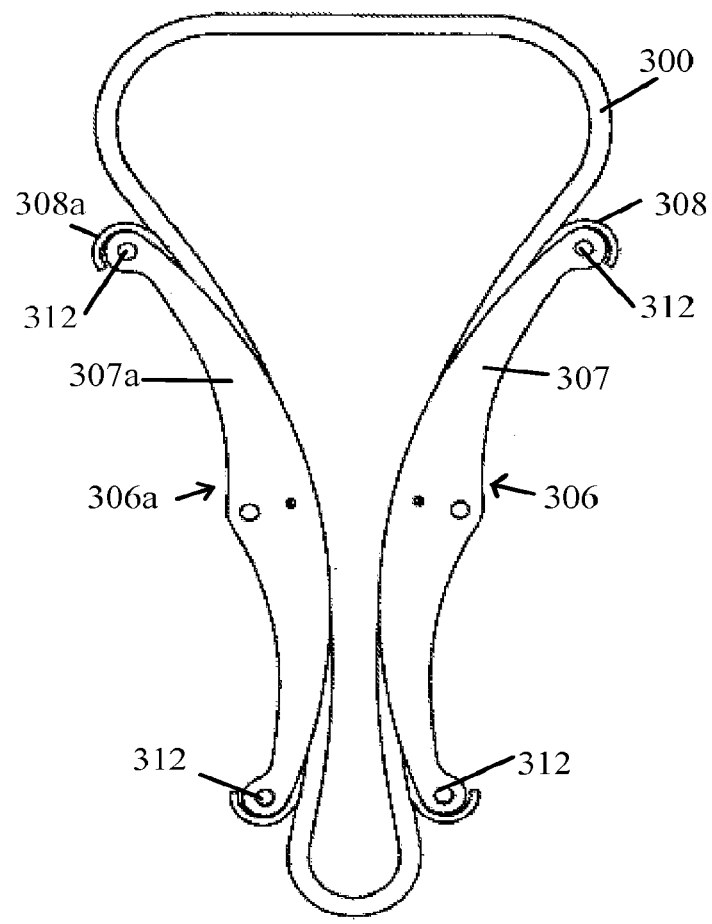
FIG. 3 shows a schematic of independently functioning dual tensioners.
Figure 4:
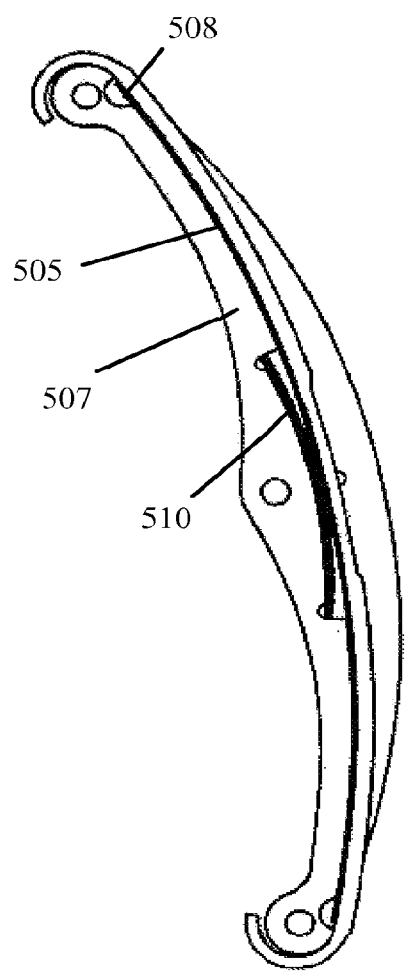
FIG. 4 shows a cut away section of a conventional blade tensioner.

The blade spring 510 shown in FIG. 4 is indicated as being of a much shorter length than chain guide 508. It is within the contemplation of this invention, however, that other blade spring configurations may be used, such as those consisting of a blade spring substantially the entire length of chain guide 508. Also, multiple short blade springs 510 may be located in series along the length of the bracket body 507.

Furthermore, the strength capabilities of each blade spring 510 in each of the mechanical tensioners 506 and 506a, may be the same or different. If a weaker spring is provided within the first tensioner (for example, 506), relative to the spring within the second tensioner (506a), all of the slack chain control is transferred to the second tensioner 506a by the linking member 516. In this configuration, the first tensioner 506 acts as a guide having the capability to follow an uncontrolled chain 500 from its normal path, thus providing improved damping.

In addition, the tensioners 506 and 506a may either be of the same length or of different lengths, as required by the design parameters of the power transmission chain system into which the tensioning device of the present invention is installed.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A chain guide and tensioner assembly for use with an endless chain loop consisting substantially of two strands of chain drivingly connecting a drive sprocket to at least one driven sprocket comprising:
    a first tensioner comprising a first bracket body, a first chain guide having a first chain sliding face for contacting one of the two strands of chain, at least one blade spring and a support member;
    a second tensioner comprising a second bracket body, a second chain guide having a second chain sliding face for contacting the other of the two strands of chain, and at least one blade spring and a support member;
    a rigid linking member having two ends, a first end pivotally secured to the first tensioner and a second end pivotally secured to the second tensioner;
    wherein the first tensioner is secured by a first mounting means to a first location on an engine housing and the second tensioner is secured by a second mounting means to a second location on the engine housing.

2. The chain guide and tensioner assembly of claim 1 wherein the first blade spring exhibits the same strength capabilities as the second blade spring.

3. The chain guide and tensioner assembly of claim 1 wherein the first blade spring exhibits a different strength capability than the second blade spring.

4. The chain guide and tensioner assembly of claim 1 wherein the first mounting means and the second mounting means are located at an end of each of the bracket bodies of each of the tensioners nearest to the driving sprocket.

5. The chain guide and tensioner assembly of claim 1 wherein the first mounting means and the second mounting means are each located at approximately corresponding points along the longitudinal length of each of the tensioners.

6. The chain guide and tensioner assembly of claim 1 wherein the first mounting means and the second mounting means are located at an end of each of the bracket bodies of each of the tensioners nearest to the driven sprocket.

7. The chain guide and tensioner assembly of claim 1 wherein the first end of the rigid linking member is attached to the first tensioner at a location that is different from the location of attachment of the second end of the rigid linking member to the second tensioner.

8. The chain guide and tensioner assembly of claim 1 wherein the first tensioner and the second tensioner are the same size.

9. The chain guide and tensioner assembly of claim 1 wherein the first tensioner and the second tensioner are different sizes.

* * * * *